United States Patent [19]
Dupont et al.

[11] Patent Number: 5,430,823
[45] Date of Patent: Jul. 4, 1995

[54] OPTICAL FIBER CONNECTION CASSETTE

[75] Inventors: Michel Dupont, Boulzicourt; Jean-Pierre Boyer, Chaville; Juan Bezada, Guyancourt; René Baptiste, Elancourt, all of France

[73] Assignees: Alcatel Cable Interface, Vrigne aux Bois; Bull S.A., Paris Cedex, both of France

[21] Appl. No.: 771,103

[22] Filed: Oct. 4, 1991

[30] Foreign Application Priority Data

Oct. 4, 1990 [FR] France .................................. 90 12244

[51] Int. Cl.⁶ .................................................. G02B 6/36
[52] U.S. Cl. .................................... 385/135; 385/134; 385/139; 385/55
[58] Field of Search ................... 385/14, 76, 77, 134, 385/135, 137, 138, 139, 53, 55

[56] References Cited

U.S. PATENT DOCUMENTS

| 4,708,430 | 11/1987 | Donaldson et al. | 385/135 X |
| 4,752,110 | 6/1988 | Blanchet et al. | 385/134 X |
| 4,971,421 | 11/1990 | Ori | 385/135 X |
| 5,024,498 | 6/1991 | Becker et al. | 385/134 X |
| 5,071,211 | 12/1991 | Debortoli et al. | 385/76 |
| 5,142,607 | 8/1992 | Petrotta et al. | 385/135 |
| 5,187,766 | 2/1993 | Finzel et al. | 385/135 |
| 5,285,515 | 2/1994 | Milanowski et al. | 385/135 |
| 5,311,612 | 5/1994 | Vincent et al. | 385/135 |
| 5,323,478 | 6/1994 | Milanowski et al. | 385/135 |
| 5,353,367 | 10/1994 | Czosnowski et al. | 385/135 |

FOREIGN PATENT DOCUMENTS

| 0208155 | 1/1987 | European Pat. Off. | 385/135 X |
| 0281196 | 10/1990 | European Pat. Off. | 385/135 X |
| 0288808 | 10/1990 | European Pat. Off. | 385/135 X |
| 59-102208 | 6/1984 | Japan | 385/135 X |

*Primary Examiner*—Brian Healy
*Attorney, Agent, or Firm*—Sughrue, Mion, Zinn, Macpeak & Seas

[57] ABSTRACT

The cassette is mounted horizontally or vertically on a support rail and defines a front action face. One of its compartments is used for storing an excess length of optical cable while its other compartment is used for storing an excess length of optical jumper. The cassette includes a fixed first connection for the cable conductor and a removable cross-connection second connection for the jumper, said connections being mounted separately, substantially on the front action face, and being interconnected by an optical lead which is wound down together with the cable conductor and in the same compartment. The cassette is applicable to a distribution frame for telephones or computers.

17 Claims, 6 Drawing Sheets

OPTICAL FIBER CONNECTION CASSETTE

The present invention relates to telecommunications, and in particular to telephone or data transmission via optical means. It is applicable to making cross-connections between cables or equipments, as takes place in distribution frames or subdistribution frames.

BACKGROUND OF THE INVENTION

The cross-connection problem per se is already known. Cross-connections are established by means of independent jumpers that provide the desired interconnections between connection boxes referred to as "optical cassettes". Thus, for example, the conductors of a "transport" cable are selectively connected to the conductors of one or more smaller capacity "distribution" cables via a first set of optical cassettes attributed to the transport cables, a second set of optical cassettes attributed to the distribution cables, and jumpers extending between the cassettes in the two sets. These two sets of cassettes and the interconnecting jumpers constitute a distribution frame or a subdistribution frame in a telephone or a computer transmission installation.

Each of the cables is fixed at one of its ends to its set of cassettes. Its rods, or pairs of conductors, or individual conductors are separated from one another at the cable fixing point, and they are guided to corresponding cassettes, and a certain amount of excess length of each of them is left in place. The cassettes serve to store the excess lengths, with the excess lengths being used for connection to jumpers, for establishing or changing connections.

Patent document FR-2 573 544 in particular describes a cassette of this type. That cassette has a bottom on which the following are defined on a single side thereof: an outer ring between an outer wall and an inner wall; and an inner ring between the above-mentioned inner wall and at least one central cylinder. The rings are used for storing excess cable conductor length(s) together with conductor(s) of a jumper cable, with the conductors being interconnected inside the cassette by one or more connector devices in the form of an optical connector strip. Tabs on the edges of these walls and of the cylinder serve to hold the excess lengths inside the cassette.

With a cassette of this type, any action on the connector device leads to excess conductor lengths from both cables being manipulated in order to separate the conductors and change the connections.

In the Applicants' patent application FR 89 16813 proposals are made for a different type of cassette referred to as a "two-compartment" cassette having a plate at one of its ends extending the cassette and designed to receive a block of optical connectors. The compartments of that cassette are used for storing respectively a first excess length and a second excess length of a single optical conductor or of several optical conductors. Each conductor is held where it passes from one compartment to another to enable one of its excess lengths to be manipulated without affecting the other excess length thus made independent therefrom which remains coiled down in its own compartment.

Thus, one of the excess lengths is used for extracting one of the cassettes from a stack of cassettes, while the other one is used for changing or correcting a connection under conditions of use.

An object of the present invention is to simplify conditions of use as much as possible and to make it particularly easy and quick to make optional connection changes and to establish interconnections within distribution frames.

SUMMARY OF THE INVENTION

The present invention provides an optical connection cassette which is generally rectangular and flat in overall shape having two large faces and four small faces in two opposite pairs, and having two compartments on opposite sides of an internal separation web extending parallel to said large faces, wherein the cassette has two of said opposite small faces along two edges of said web respectively defining a "front" action face and a "rear" fixing face which is fitted with cassette mounting and fixing means for mounting and fixing the cassette on a support under operating conditions, each of the two compartments being accessible through at least one of said front action face and said rear fixing face, wherein a "first" one of the compartments is used for storing an excess length of at least one conductor of an optical cable, and a "second" one of said compartments is used for independently storing an excess length of an optical jumper for each of the corresponding cable conductors coiled down in the first compartment, and for connection thereto, and wherein the cassette further includes individual optical connection means for connecting each jumper to each corresponding cable conductor, said individual optical connection means being mounted substantially on said front action face.

Said connection means for connecting each jumper to the corresponding cable conductor may comprise an optical coupling forming a "fixed" first connection therebetween, mounted on an emplacement defined on the web in the first compartment and having clamping tabs with positioning gaps and ribs for retaining each optical coupling.

The coupling means for coupling each jumper to the corresponding cable conductor may further include a connector forming a "cross-connection" second connection of the type having two half-connectors, and an optical lead wound down in the first compartment and firstly provided with one of the half-connectors and secondly connected by said optical coupling to the cable conductor, with said jumper itself being prefitted with the other half-connector.

The connector may be held on a support piece that is removably mounted on the action face in a predefined housing on the web and in the first compartment, the support piece including a mounting and retention finger for engaging in said housing.

The second compartment may be defined between the web and a lid on one of the large faces and has an open front face in which the support piece constitutes an obstacle for retaining each jumper that is wound down therein, and the second compartment defined by the web has projecting ribs with tabs on the ribs for retaining the excess lengths that are wound down thereon.

The cassette fixing and mounting means may be constituted by two vertical sets of several resilient snap-fastening tabs on the rear face of the cassette, each tab having an inwardly-directed end catch and an outwardly-directed actuating lever, the tab being adapted to make it possible to mount the cassette on a frame member of the rectilinear rail type or of the channel section bar type having gaps in its flanges at a pitch which is a multiple of the pitch between the snap-fastening tabs in each set of tabs.

It is also advantageous for the lid of the second compartment to include lateral projections above the two sets of snap-fastening tabs to provide blind guidance and to ensure that only the levers on the sets of snap-fastening tabs on the cassette concerned are actuated manually.

BRIEF DESCRIPTION OF THE DRAWINGS

An embodiment of the invention is described by way of example with reference to the accompanying drawings, in which.

DETAILED DESCRIPTION

Figure 1:
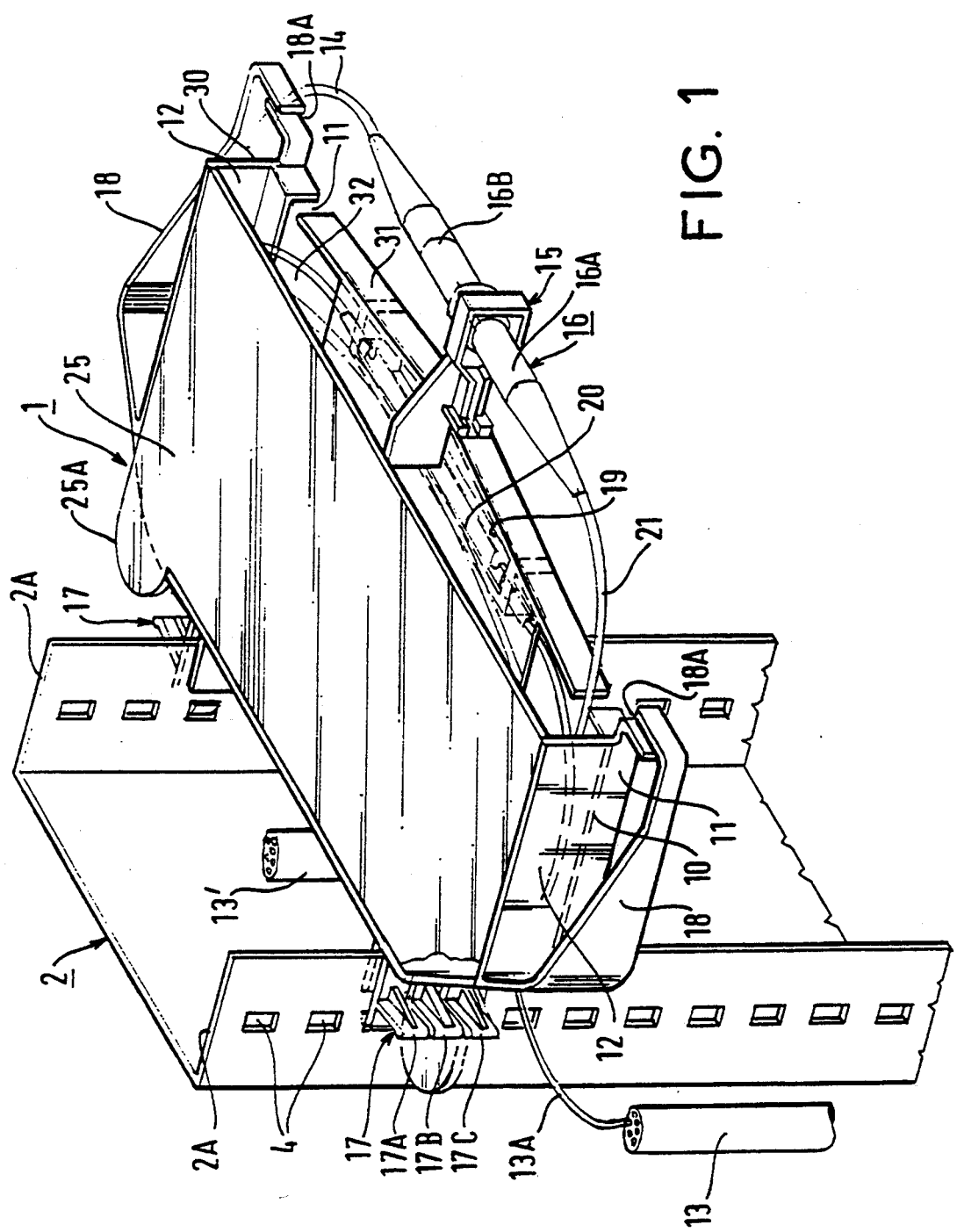
FIGS. 1 and 2 are diagrammatic perspective views of an optical connection cassette of the invention shown mounted on two different support rails.

The optical connection cassette of the present invention is given an overall reference 1. It is mounted horizontally equally well on two different types of frame member 2 and 3, as can be seen in FIGS. 1 and 2.

The sole cassette 1 shown in the drawings together with other cassettes identical thereto are held individually on either of the frame members 2 and 3, and together they form a stack of cassettes on top of one another.

In a distribution frame or a subdistribution frame, first and second sets of cassettes mounted on the same frame member or on a pair of frame members are attributed to a first optical cable and to a second optical cable and/or to sets of equipment. Optical jumpers provide cross-connections between the individual optical conductors in the two cables and/or sets of equipment.

Figure 2:
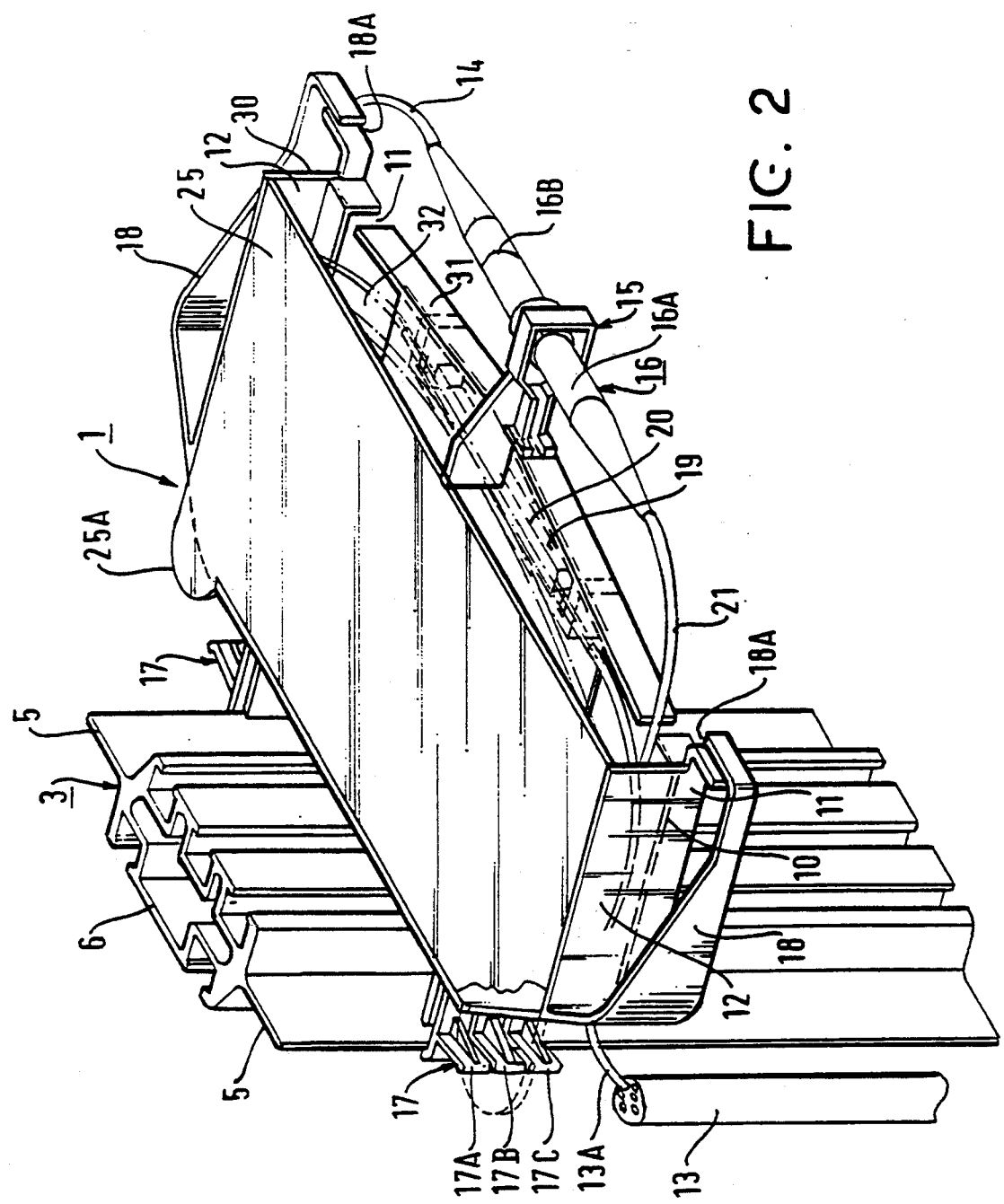

The cassette 1 is described overall with reference to FIGS. 1 and 2 where it is shown in its horizontal in-use configuration. It has two compartments 11 and 12 defined on either side of a substantially central horizontal separation web 10. The bottom compartment 11 is for storing a spare length of a conductor 13A of a cable 13. The top compartment 12 is for storing a spare length of a jumper conductor 14 for connection to the conductor 13A. Naturally a plurality of cable conductors and a plurality of jumper conductors may be wound down in their respective compartments 11 and 12, and interconnected. However, the number of such conductors remains limited to a few, and in particular they may be a pair of conductors constituting a cable line for connection to two jumper conductors.

The cassette 1 may be used "upsidedown", i.e. with the "bottom" compartment 11 becoming the top compartment and with the "top" compartment 12 becoming the bottom compartment, but without interchanging its front and back faces. It may also be observed that the cassette 1 is equally suitable for mounting vertically on a frame member 2 or 3 that is then horizontal, in which case the action front face of the cassette is vertical.

On its front face, the cassette 1 receives a support piece 15 for a connector 16. On its rear face it includes a snap-fastening device it for engaging the channel section frame member 2 or the extrusion frame member 3. In addition, on its sides, it includes two rings 18 for passing the jumpers serving a stack of cassettes, with each ring split at the front 18A to enable the jumper for the corresponding cassette to be removed from the ring.

An emplacement 19 for retaining an optical coupling 20 is also provided on the bottom face of the web 10, inside the bottom compartment 11. This optical coupling 20 connects the conductor 13A of the cable 13 to the conductor of the jumper 14 in the absence of a connector 16 mounted on the front face, or preferably to an optical lead 21 wound down together with the conductor 13 in the compartment 11. The lead 21 is also connected on the front face of the cassette to the jumper 14 by means of the front connector 16.

Advantageously, the ends of the lead 21 and of the jumper 14 that are to be interconnected are initially fitted with respective complementary and interfitting half-connectors 16A and 16B, for example, thereby making it easy to establish connections quickly on an operating site. The connector 16 is immediately accessible on the front face of the cassette for installing a connection or for altering an existing connection without there being any need to extract the cassette from its stack. It thus constitutes a disconnectable connection referred to as "cross-connection" connection.

The optical coupling 20 is established on site immediately before the cassette is installed in its stack. This optical coupling constitutes a connection that is fixed and final and which does not require subsequent changing, except under exceptional circumstances.

In the preferred embodiment shown, the cassette is 24 mm high. It is made up of three molded parts as follows:

a body defined by the web 10 together with the two compartments 11 and 12 on opposite sides thereof, the side rings 18, and the rear snap-fastening device 17;

the connector support piece 15 removably mounted on the front face of the body; and a removable lid 25 which is fixed on the top face of the top compartment 12, e.g. by means of a clip.

In this preferred embodiment, the snap-fastening device 17 is made up of two vertical sets of three snap-fastening tabs each 17A, 17B, and 17C. It enables the cassette to be installed on the channel section frame member 2 whose flanges 2A have gaps 4 at a pitch of 16 mm or on the extruded frame member 3 which has two lateral fins 5 and a ribbed central portion 6.

Thus, in a stack of cassettes on the channel section frame member 2, the individual cassettes are secured alternately by the two outermost snap-fastening tabs 17A and 17C of one cassette and then by the middle snap-fastening tabs 17B of the adjacent cassette, with the snap-fastening tabs being engaged in the corresponding gaps in each of the flanges 2A of the channel section frame member.

With the channel section frame member 2, the cable may be laid equally well outside the channel section or inside the channel section behind the stack of cassettes, as represented by cable 13 and by cable 13', respectively.

With a stack of cassettes on the frame member 3, successive cassettes are retained by their two sets of tabs engaging the edges of the side fins 5 on the extrusion.

Advantageously, the lid 25 of the top compartment 12 has two rear projections 25A at substantially the same level as the top tab 17A and disposed outside the two sets of tabs 17.

As can also be seen in FIGS. 1 and 2, the web 10 has a peripheral rim 30 projecting from both of its faces, except along the front edge of its top face. This peripheral rim delimits the two compartments 11 and 12, it closes the front face 31 of the bottom compartment, but it leaves the entire front face 32 of the top compartment 12 open. These two front faces 31 and 32 of the compartments constitute an "action" front face of the cassette when in use. The only obstacle in the front face of the compartment 12 for retaining the excess length(s) of jumper stored in the compartment 12 is constituted by the support piece 15 for the connector 16, when said support piece is in place.

In general, it may also be observed that the cassette is somewhat longer than it is wide and that its two rear corners are truncated to form rounded transitions between its short side faces and its rear side face. It is entirely symmetrical on either side of a central vertical section plane.

Structural details of the cassette can be seen more particularly in FIGS. 3 to 8, and FIGS. 9 to 12 show details of the connector support piece that it receives. In these figures, items that are mentioned above are designated by the same references and are not described in detail again.

The top compartment 12 has no internal portion projecting above the top face of the web 10. The projecting peripheral rim 30 which delimits it is continuous around the two side faces and the rear face of the compartment. The excess length of jumper is stored as an un-constrained coil in this compartment and it is retained only by the front connector support piece 15, when said piece is in place on the front face of the cassette.

Figure 5:
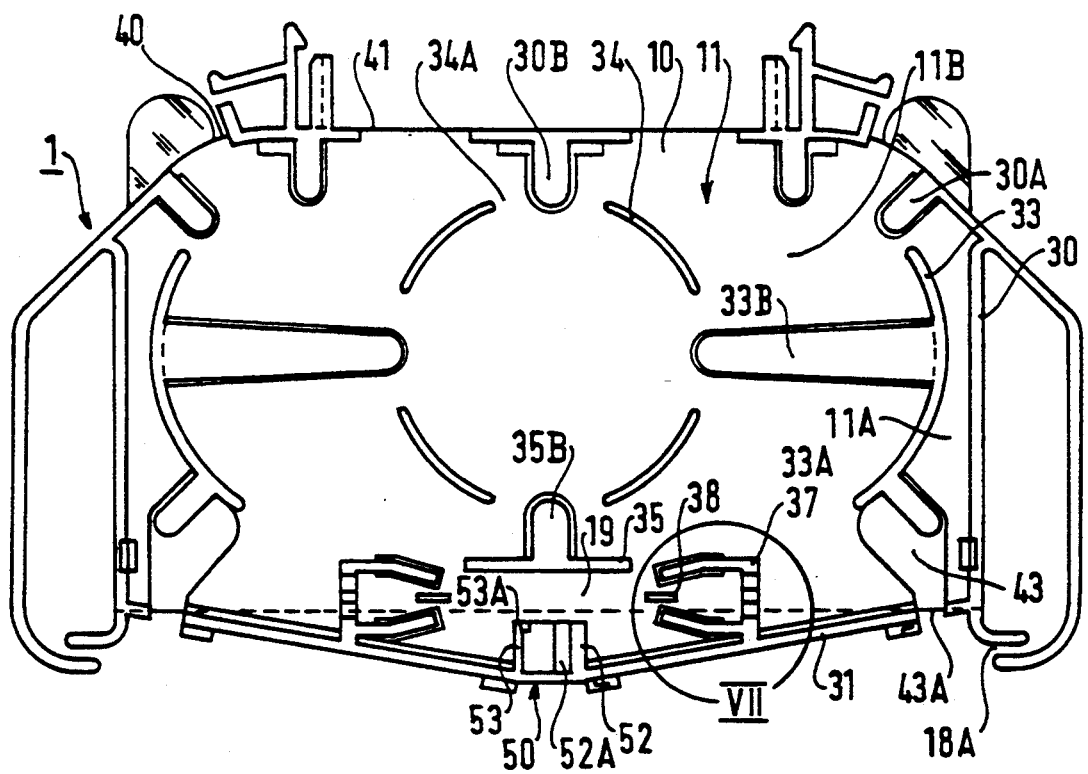
FIG. 5 is a view of the cassette as seen from below.

With reference to FIG. 5, it can be seen that for the compartment 11 the web 10 presents not only its peripheral rim 30 which delimits the compartment and defines its four walls in non-continuous manner, but also a plurality of projecting ribs that extend over the same height as the walls of the compartment. These ribs comprise firstly two lateral arcuate ribs 33 relatively close to the side walls, four central arcuate ribs 34 together forming a central cylindrical portion having gaps 34A defined between the ribs 34 and centered relative to the four walls of the compartment, and a front longitudinal rib 35 extending between the central cylindrical portion and the front wall. There are also two small transverse front ribs 37 which together with the front wall and the rib 35 delimit the above-mentioned front emplacement 19 for receiving one or more optical couplings, and the emplacement 19 contains short terminal ribs 38.

The ribs 33 and the side walls together delimit side channels 11A inside the compartment 11. These ribs 33 and the four central ribs 34 together delimit an internal ring 11B which communicates with the channels 11A and co-operates therewith to coil down excess lengths of each cable conductor appropriately together with the corresponding leads inside the compartment 11 of the cassette.

These ribs and the side and rear walls of the compartment 11 include tabs 30A and 33A that extend transversely beneath the channels 11A, and tabs 30B, 33B, and 35B that extend transversely beneath the ring 11B, level with the gaps 34A for the purpose of retaining the excess lengths wound down in the compartment 11.

Openings 40 and 41 through the rear wall of the compartment 11 define two possible inlet accesses on either side of each of the two sets of tabs of the snap-fastening device 17, with the accesses enabling the cable to be inserted from the rear either laterally or centrally.

To obtain sufficient room for the emplacement 19 and the adjacent portion of the ring 11B, and also for a housing 50 for holding and retaining the front connector support piece 15, the web 10 and thus the compartment 11 bulge out in the middles of their front faces.

Figure 7:
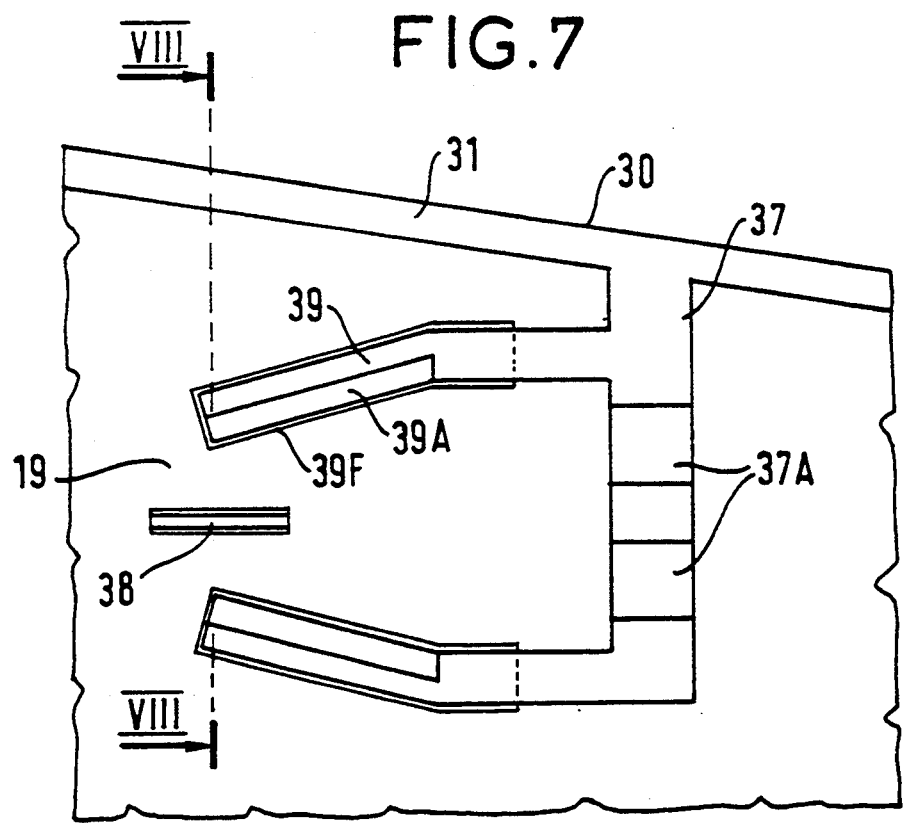
FIG. 7 is a view on a larger scale of a detail VII of FIG. 5.
Figure 8:
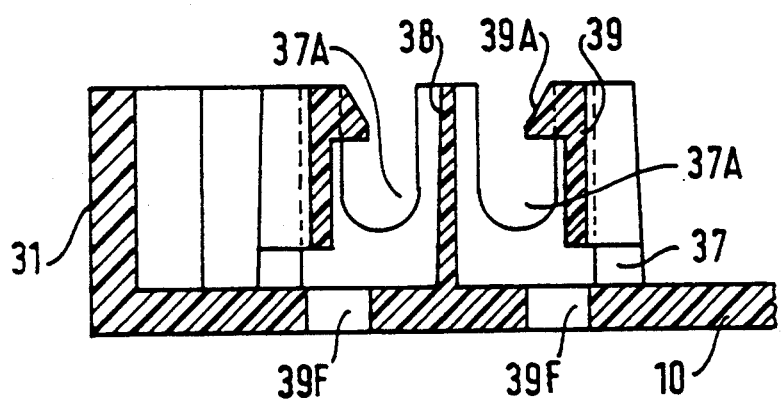
FIG. 8 is a view on arrows VIII—VIII of FIG. 7.
Figure 9:
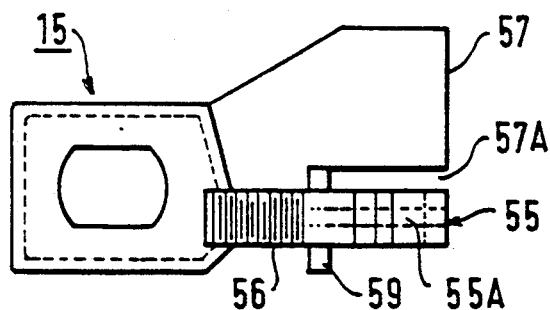
FIGS. 9 to 12 are respectively a side view, an end view, a bottom view, and a perspective view all on a larger scale than the preceding figures and showing a support piece removably mounted on the front face of the cassette.
Figure 10:
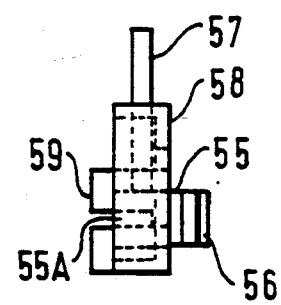
Figure 11:
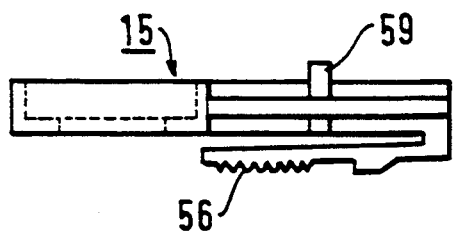
Figure 12:
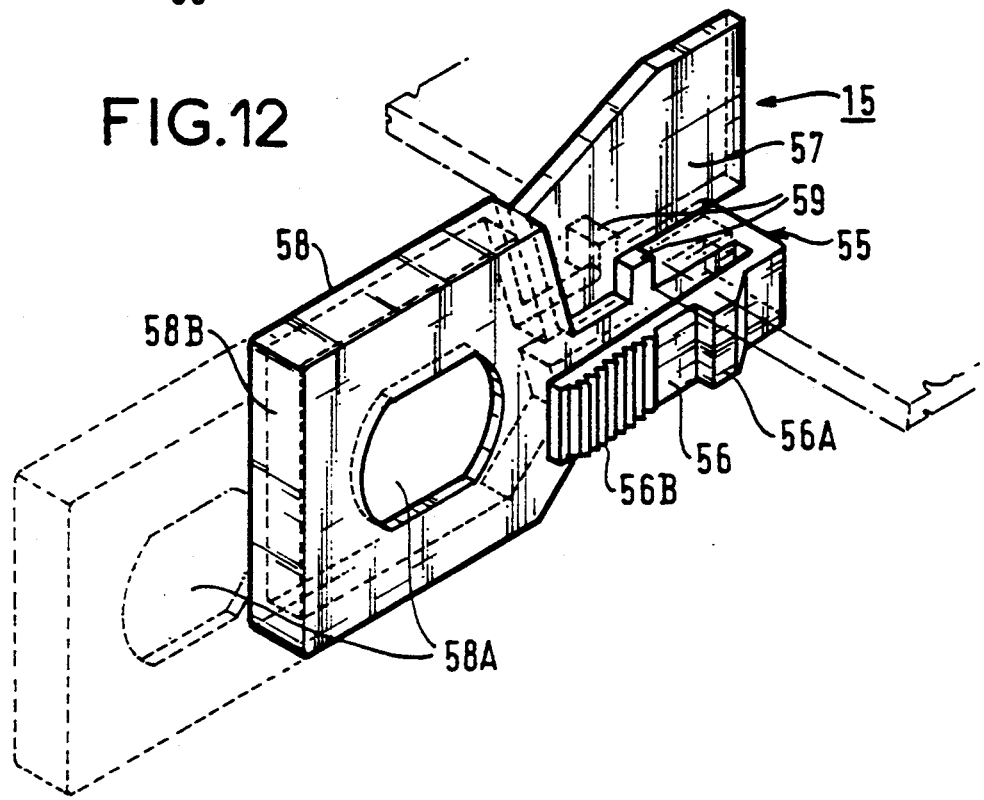

The emplacement 19 is described with reference to FIG. 5 and more particularly with reference to FIGS. 7 and 8. It is shown as being organized to receive and retain two optical couplings provided between two cable conductors and two optical leads.

To this end, each of the transverse ribs 37 has two gaps 37A disposed between a pair of resilient tabs 39. The resilient tabs 39 slope towards the inside of the coupling emplacement, with their ends being disposed on opposite sides of the corresponding terminal ribs 38. They have chamfered inside edges 39A constituting respective inwardly-projecting terminal catches for each gap 37A with the gaps being disposed on opposite sides of the rib 38.

An optical coupling positioned in one of the gaps 37A is thus locked against the rib 38 by one of the tabs 39. Naturally this coupling emplacement may be adapted to receive one optical coupling only or to receive more than two optical couplings. Support wedges (not shown) may also be provided in the coupling emplacement 19 facing the gaps 37A so that each optical coupling positioned at the bottom of a pair of gaps is also held against the wedges.

Figure 3:
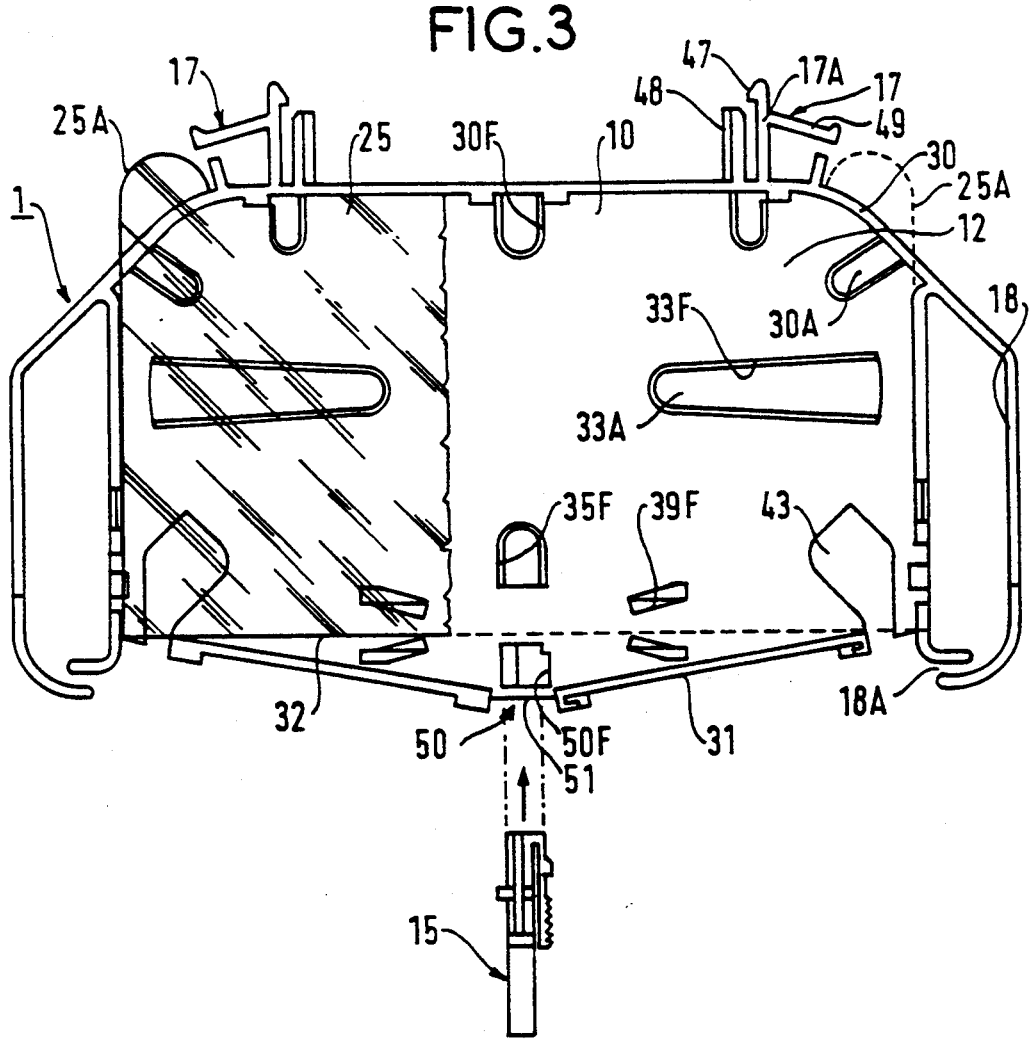
FIG. 3 is a plan view of the cassette.

It may also be observed that the web 10 has multiple windows associated with the various tabs integrally molded on the ribs (FIG. 5), with the windows being given the same numerical references as the corresponding tabs plus the letter F (see FIG. 3). One of these windows and each end of the front edge of the web is identified differently by means of reference 43. This window 43 is larger in size than the tabs 33A on the ribs 33 and it serves to put the compartments into communication with each other and to define a front opening 43A in the compartment 11 for allowing the or each optical lead to leave the compartment together with the corresponding terminal half-connector.

Figure 6:
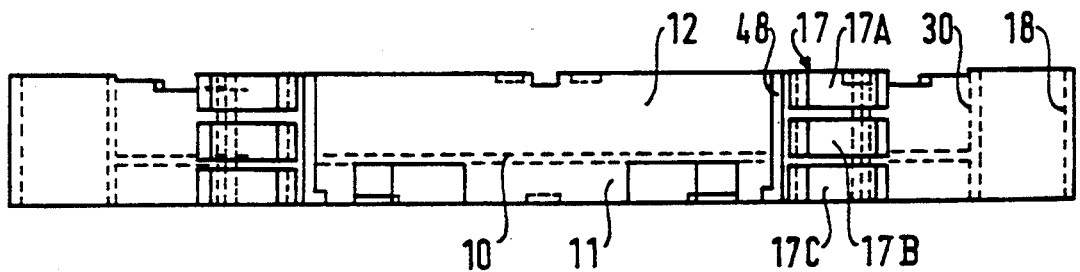
FIG. 6 is a view of its rear face.

The rear snap-fastening device 17 is described with reference to FIGS. 3 or 5 and 6, in conjunction with FIGS. 1 and 2.

It comprises two sets, each of three resilient snap-fastening tabs, with each tab having a terminal catch 47 projecting on its inside face looking towards the plane of symmetry of the cassette. It also includes respective rigid inside tabs 48 associated with the sets of tabs 17A, 17B, and 17C for abutment purposes, extending continuously up the entire height of each set, and being slightly offset therefrom. The rear edge of this abutment tab does not project so far as the terminal catches 47 and it is chamfered where it faces the terminal catches.

This disposition serves to retain the cassette on the channel section frame member 2 whose flanges are inserted between the sets of snap-fastening tabs and the abutment tabs until the terminal catches 47 engage in the corresponding gaps 4. It also makes it possible to retain the cassette on the frame member 3 where the edges of the fins 5 are received between the terminal catches and the rear edges of the abutment tabs 48.

In addition, each snap-fastening tab 17A to 17C has a long projection 49 on its outside face constituting a lever for actuating the snap-fastening resilient tab. The levers 49 are used for installing the cassette on a frame member, and above all they are used for releasing the terminal catches from the gaps in the frame member 2 for extracting the cassette.

The projection 25A from each end of the rear edge of the lid 25 extends from immediately above the top snap-fastening tab 17A in each set, and when a particular cassette is to be disengaged, it enables an operator to place fingers unseen on the snap-fastening tab actuator levers belonging to that cassette only.

Figure 4:
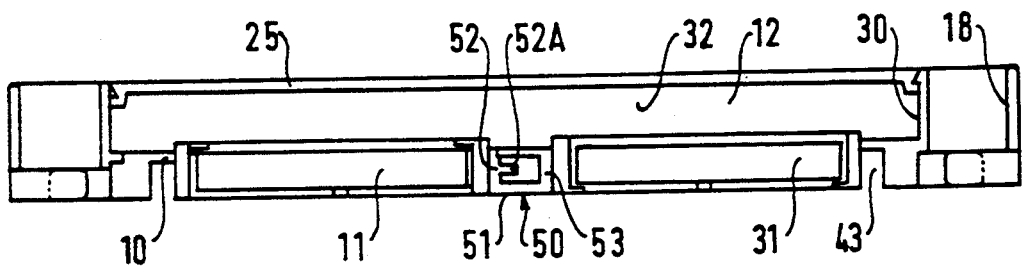
FIG. 4 is a front view.

FIGS. 3 to 5 also show the housing 50 defined on the front face of the cassette for fixing the front connector support piece 15, and FIGS. 9 to 12 show the piece 15 itself.

The housing 50 is defined by a central opening 51 in the front wall 31 of the bottom compartment 11 and by two ribs 52 and 53 for guiding and holding the piece 15. These two ribs 52 and 53 belong to the web 10 like the other ribs in the compartment 11. They extend from the two side edges of the housing 50 towards the above-mentioned emplacement 19 for a coupling 20, and they constitute the front limit thereof. One of these ribs 52 has a horizontal inside edge 52A halfway up and extending along its entire length. The other rib 53 has grooves 53A formed vertically in its inside face defining one or more successive shoulder portions starting from the outside for retaining the piece 15.

The front connector support piece 15 has a finger 55 on its "rear" portion facing the cassette, which finger 55 is flanked by a resilient tab 56 for mounting it and fixing it in the housing 50, and by a fin 57 extending above the finger and over substantially the same length. The fin is separated from the finger by a slot 57A. It has the same height as the top compartment 12 and it constitutes an obstacle in the front face 32 thereof when the piece 15 is installed.

The other or "front" end of the piece 15 has a support 58 per se including a hole 58A or optionally including two identical holes as suggested by dashed lines, or even two rows of identical holes, for receiving one or more connectors, each connector being received in a corresponding hole. The support 58 is fixed to the finger and to the fin.

The finger 55 has a groove 55A in its face that does not face towards the resilient tab 56. The groove 55A is guided on the edge 52A of the housing.

The resilient tab 56 which is fixed to the end of the finger also extends at a small distance from the finger along the length thereof. Its outside face has a snap-fastening catch 56A for locking against the shouldered rib 53. Its free end portion is preferably provided with multiple small grooves 56B to facilitate grasping in the hand and to facilitate actuation thereof whenever the piece 15 is installed in, or is removed from, the housing 50.

A projection 59 on either side of the groove 55A at the end of the slot 57A constitutes a stop abutment on the edges of the housing 50 when the piece 15 is installed and received in its housing. Under such conditions, the rear of the fin 57 is just inserted inside the top compartment 12 and beneath the lid, with the end portion of the resilient tab 56 remaining outside and accessible from in front of the bottom compartment 11.

In the embodiment shown, the groove 55A of the finger opens out into a recess in the corresponding face of the support piece 58, and only the periphery of the support piece 58 is of comparable depth to the width of the finger. The front edge 58B of this support tab is then used to receive a label for identifying the connections it carries.

In comparable manner, the front wall of the bottom compartment is also advantageously used for identifying the cassette and receives a cassette-identifying label on one side or the other of the housing 50.

The successive operations for installing this optical connection cassette are described below, assuming that optical leads are initially available, each fitted at one end with an individual half-connector 16A, and that jumpers are also available each fitted at one end with an individual half-connector 16B.

These operations then consist in:

splicing the end of the cable conductor to the free end of the optical lead, with the splice being made outside the cassette and giving rise to the above-mentioned optical coupling 20;

placing the optical coupling in its emplacement 19 inside the cassette;

fixing the cassette on the frame member, possibly stacking the cassette above or below other cassettes that have already been installed, and taking up the excess length of the cable conductor and substantially all of the optical lead inside the bottom compartment 11;

coiling down the jumper and slotting it into the top compartment 12, after which it is retained therein by snapping the connector support piece 15 into the front of the cassette; and inserting one of the two half-connectors 16A and 16B into the support and then connecting it to the other half-connector.

In operation, existing connections can be changed immediately and easily. This is done merely by undoing the connections at the appropriate front connector by disconnecting the half-connectors, by removing the appropriate lengths of jumper coiled in the top compartment 12, then in establishing the desired connections and coiling down the excess lengths of jumper.

We claim:

1. An optical connection cassette which is generally rectangular and flat in overall shape having two large faces and four small faces in two opposite pairs, and having two compartments on opposite sides of an internal separation web extending parallel to said large faces, wherein the cassette has two of said opposite small faces along two edges of said web respectively defining a "front" action face and a "rear" fixing face which is fitted with cassette mounting and fixing means for mounting and fixing the cassette on a support under operating conditions, each of the two compartments being accessible through at least one of said front action face and said rear fixing face, wherein a "first" one of the compartments is used for storing an excess length of at least one conductor of an optical cable, and a "second" one of said compartments is used for independently storing an excess length of an optical jumper for each of the corresponding cable conductors coiled down in the first compartment, and for connection thereto, and wherein the cassette further includes individual optical connection means for connecting each jumper to each corresponding cable conductor, said individual optical connection means being mounted substantially on said front action face.

2. An optical connection cassette according to claim 1, wherein for each jumper and the corresponding cable conductor, said connection means comprise an individual optical coupling forming a "fixed" first connection therebetween and mounted in a front emplacement defined on said web in said first compartment.

3. A cassette according to claim 2, wherein said optical coupling constitutes a splice between the jumper and the corresponding conductor, said splice being made outside the cassette and then being installed in said emplacement.

4. A cassette according to claim 2, wherein said emplacement is defined between front transverse ribs on the web in the first compartment, said ribs having positioning gaps facing the emplacement for each of the optical couplings in the cassette, and including clamping tabs inside the first compartment facing the positioning gaps.

5. A cassette according to claim 2, wherein for each jumper and the corresponding cable conductor, said connection means further include an individual optical connection device referred to as a connector having two half-connectors and constituting a "cross-connection" second connection mounted on said action front face of the cassette, and an optical lead connected by said fixed first connection to the cable conductor, wound down in said first compartment, and prefitted with one of said half-connectors, and wherein the jumper is itself prefitted at one of its ends with the other half-connector.

6. A cassette according to claim 5, further including a connector support piece removably mounted on said action front face in a front housing defined on the web.

7. A cassette according to claim 6, wherein said housing is defined between two guide grooves formed on the front of the web substantially in the middle front portion thereof and having an access opening in the action front face between the two guide ribs, and wherein said support piece includes a finger corresponding to the housing, the finger and the two guide ribs having complementary guide means and retention means.

8. A cassette according to claim 7, wherein said finger is flanked by a resilient tab inserted together therewith in said housing and guided along one of the guide ribs, said rib and the resilient tab of the finger carrying said retention means on their corresponding faces.

9. A cassette according to claim 7, wherein the guide means for guiding said finger in the housing are further constituted by a groove and a corresponding edge, one being on the finger and the other being on the other guide rib.

10. A cassette according to claim 7, wherein said support piece includes a support per se having an individual retaining hole for each connector concerning the cassette, said support extending said finger.

11. A cassette according to claim 7, wherein said second compartment has its front face open over the entire corresponding length of the front action face, and wherein said support piece also includes a fin extending transversely to said finger and constituting an obstacle in the open front face of the second compartment when said support piece is installed on said front action face.

12. An optical connection cassette which is generally rectangular and flat in overall shape having two large faces and four small faces in two opposite pairs, and having two compartments on opposite sides of an internal separation web extending parallel to said large faces, wherein the cassette has two of said opposite small faces along two edges of said web respectively defining a "front" action face and a "rear" fixing face which is fitted with cassette mounting and fixing means for mounting and fixing the cassette on a support under operating conditions, each of the two compartments being accessible through at least one of said front action face and said rear fixing face, wherein a "first" one of the compartments is used for storing an excess length of at least one conductor of an optical cable, and a "second" one of said compartments is used for independently storing an excess length of an optical jumper for each of the corresponding cable conductors coiled down in the first compartment, and for connection thereto, and wherein the cassette further includes individual optical connection means for connecting each jumper to each corresponding cable conductor, said individual optical connection means being mounted substantially on said front action face, wherein said first and second compartments are delimited by a peripheral rim projecting in both directions from the web around at least three of the sides of the second compartment, thereby defining two side walls and the rear wall therefore, and discontinuously around four of the sides of the first compartment, thereby defining a nearly closed front face therefore belonging to the action front face of the cassette, two side walls, and a rear face having rear accesses through which each of the cable conductors wound down in said first compartment reaches said first compartment, and wherein it includes the cassette mounting and fixing means constituted by two sets of individual snap-fastening resilient tabs projecting over substantially the entire height of the rear walls of the two compartments.

13. A cassette according to claim 12, wherein each of the snap-fastening tabs has an inwardly directed terminal catch facing the snap-fastening tab at the same level in the other set, with the pitch between tabs in each of the sets being a submultiple of the pitch of gaps on the said support constituted by a channel section rail, with each set being associated with an outwardly projecting inner rigid tab extending up the full height thereof, thereby enabling the cassette to be mounted either on said channel section rail or else on a rectilinear rail.

14. A cassette according to claim 12, wherein said snap-fastening tabs also include respective outwardly directed projections constituting levers for actuating the corresponding snap-fastening tabs.

15. A cassette according to claim 14, wherein said second compartment has two rear projections from the corresponding one of the large faces of the cassette and extending on the outsides of each of the two sets of snap-fastening tabs, substantially level with an end one of the snap-fastening tabs in each of the sets, the projections constituting blind guidance means for the fingers of an operator enabling the operator to actuate only those snap-fastening tabs that correspond to a given cassette when that cassette is to be extracted from a stack of identical cassettes on a common support.

16. A cassette according to claim 14, having a middle vertical plane of symmetry extending perpendicularly to said web, enabling it to be mounted horizontally on a vertical support with either one of said first and second compartments then constituting a top compartment while the other one constitutes a bottom compartment, or else enabling the cassette to be mounted vertically on a support which is horizontal.

17. An optical connection cassette which is generally rectangular and flat in overall shape having two large faces and four small faces in two opposite pairs, and having two compartments on opposite sides of an internal separation web extending parallel to said large faces, wherein the cassette has two of said opposite small faces along two edges of said web respectively defining a "front" action face and a "rear" fixing face which is fitted with cassette mounting and fixing means for mounting and fixing the cassette on a support under operating conditions, each of the two compartments being accessible through at least one of said front action face and said rear fixing face, wherein a "first" one of the compartments is used for storing an excess length of at least one conductor of an optical cable, and a "second" one of said compartments is used for independently storing an excess length of an optical jumper for each of the corresponding cable conductors coiled down in the first compartment, and for connection thereto, and wherein the cassette includes individual optical connection means for connecting each jumper to each corresponding cable conductor, said individual optical connection means being mounted substantially on said front action face and wherein said cassette further includes retention means for supporting said optical connection means parallel to said front action face.

* * * * *